United States Patent
Zhang et al.

(10) Patent No.: US 7,317,878 B2
(45) Date of Patent: Jan. 8, 2008

(54) QUANTUM SWITCH TELEPORTATION FOR TWO RECEIVERS

(75) Inventors: Yun Zhang, Tokyo (JP); Katsuyuki Kasai, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 721 days.

(21) Appl. No.: 10/345,959

(22) Filed: Jan. 17, 2003

(65) Prior Publication Data

US 2004/0018021 A1 Jan. 29, 2004

(30) Foreign Application Priority Data

Jul. 23, 2002 (JP) ............... 2002-213977

(51) Int. Cl.
H04B 10/04 (2006.01)
H04B 10/12 (2006.01)
(52) U.S. Cl. ..................... 398/201; 398/185
(58) Field of Classification Search ............ 398/135, 398/138
See application file for complete search history.

(56) References Cited

U.S. PATENT DOCUMENTS 6,444,999 B1 * 9/2002 Tomita .................. 257/14
2002/0041687 A1 * 4/2002 Parks et al. .............. 380/263
2003/0123516 A1 * 7/2003 Steinberg et al. .......... 372/102
2004/0109564 A1 * 6/2004 Cerf et al. ................ 380/256

OTHER PUBLICATIONS

"Quantum Switch Teleportation with Continuous Variables Using two-mode Squeezed Light," Quantum Electronics and Laser Science Conference, 2002. QELS'02. Technical Digest, May 24, 2002 to Zhang et al.*
J. Zhang et al., "Quantum Switch for Continuous Variable Teleportation", Journal of OpticsB: Quantum and Semiclassical Optics, Aug. 2001.*
Continuous variables quantum switch teleportation using two-mode squeezed light, Y. Zhang, et al, The European Physical Journal D 21, 361-366 (2002).
Quantum Switch for Continuous Variable Teleportation, Abstract, J. Zhang, et al., J. Opt. B, Quantum Semiclass. Opt. Oct. 3, 2001, p. 293-297.

* cited by examiner

Primary Examiner—Shi K Li
(74) Attorney, Agent, or Firm—Foley & Lardner LLP

(57) ABSTRACT

A quantum switch teleportation system contains one pair of two-mode squeezed light source devices that generate a pair of two-mode squeezed lights, and two receiving devices. The user can switch or select the receiving device to which information will be provided based on a difference in entanglement conditions of the pair of two-mode squeezed lights.

17 Claims, 1 Drawing Sheet

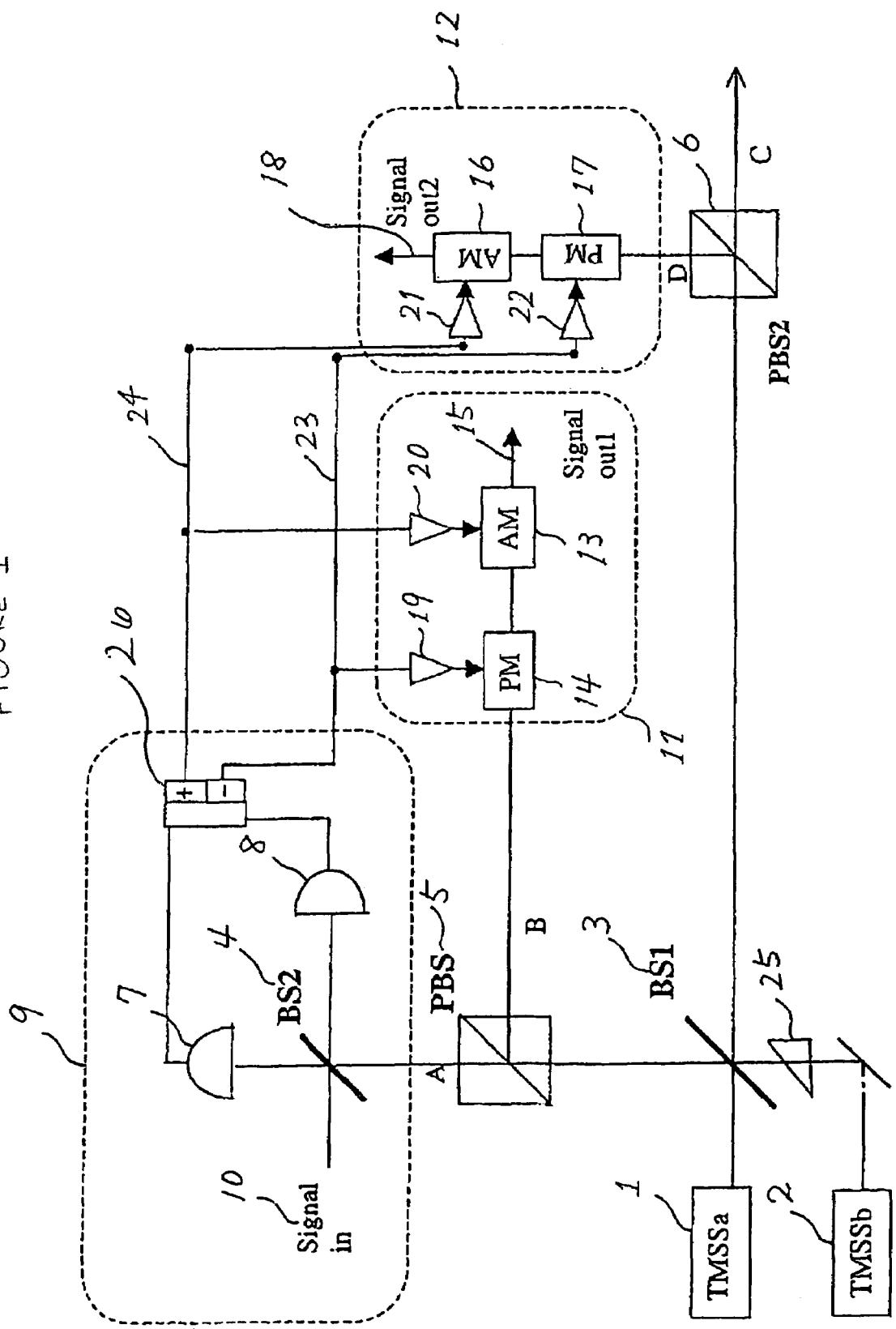

QUANTUM SWITCH TELEPORTATION FOR TWO RECEIVERS

BACKGROUND OF THE INVENTION

1. Field of the Invention

The present invention relates generally to quantum communication and specifically to a quantum switch teleportation system using quantum entanglement states to send a quantum state to two receivers, alternatively.

2. Description of the Related Art

Recently, quantum entangled state, hereinafter referred to as "entangled state" has been drawing public attention because it is thought to enable quantum communication and quantum information processing. There are many ways to generate entangled states, such as a non-locally entangled state of the Einstein, Podolsky, Rosen (EPR) type. For example, one method uses optical parametric effects and linearly combing pairs of squeezed states. In addition to single particle entanglement, many photon states of light can be used for quantum information. These states are described by continuous variables.

Quantum mechanics offers certain unique capabilities for the processing of information, whether for computation or communication. It has been demonstrated that an unknown quantum state can be transferred from a sending station to another receiving station by using prearranged entanglement state. Entanglement relates to correlation of these quantum states. The characteristics of the entangled light can be used to, for example, communicate quantum information.

One of the most striking features of quantum information is that it makes quantum teleportation possible. In a quantum teleportation scheme, the quantum state of a system can be transmitted from one location to another location through direct transmission of only classical information, provided that the sender and the receiver share a non-locally entangled state of the EPR type. Thus, quantum teleportation is a type of quantum communication technique.

Quantum communication techniques that use entangled light are described in, for example, in A. Furusawa, et. al., Science, 282, 706 (1998); T. C. Ralph, et. al., Phys. Rev. Lett. 81, 5668 (1998); Jing Zhang, et. al., Phys. Rev. A 62, 064302(2000); C. Silberhom, et. al., Phys. Rev. Lett. 86, 4267(2001); and Y. Zhang, et. al., Phys. Rev. A, 62, 023813 (2000). However, these communication techniques disclose a system having only one receiver.

An article by J. Zhang, et. al., in Journal of Optics B, 3 293 (2001) (published on the internet on Aug. 23, 2001), discloses a quantum teleportation scheme in which a quantum state is teleported from the sending station to either of two receiving stations. In this scheme, two pairs of EPR beams with identical frequency and constant phase relation are used to produce two pairs of conditional entangled beams by composing their modes on two beam splitters. One output of a beam splitter is sent to the sending station and the two outputs of the other beam splitter are sent to the respective receiving stations. Which receiving station actually receives the teleported state can be decided by correlating the in-phase or out-of-phase quadrature components of two two-mode squeezed vacuum states. However, this scheme is cumbersome and complicated because it uses two beam splitters and two pairs of EPR beams to produce two pairs of conditional entangled beams.

SUMMARY OF THE INVENTION

A preferred embodiment of the present invention provides a quantum switch teleportation system, comprising a pair of two-mode squeezed light source devices that generate a pair of two-mode squeezed lights, a first beam splitter that mixes and separates said pair of two-mode squeezed lights, a first polarizing beam splitter that separates one of the said pair of two-mode squeezed lights separated by the first beam splitter based on its polarization, a second polarizing beam splitter that separates the other one of the pair of two-mode squeezed light separated by the first beam splitter based on its polarization, and a second beam splitter that mixes an input signal with the two-mode squeezed light separated by the first polarizing beam splitter and separates the mixed input signal and the two-mode squeezed light separated by the first polarizing beam splitter. The system further comprises a quantum information input section that inputs the input signal comprising quantum states having quantum information, a pair of detectors that detect a pair of two-mode squeezed lights mixed and separated on the second beam splitter and transform the pair of two-mode squeezed lights into electric currents containing information, a first receiving device and a second receiving device. The system further comprises a first transmit path that transmits a difference information relating to the electric currents transformed by said detectors to the first receiving device and to the second receiving device, and a second transmit path that transmits a sum information relating to the electric currents transformed by said detectors to the first receiving device and to the second receiving device.

Another preferred embodiment of the present invention provides a quantum switch teleportation system, comprising a pair of two-mode squeezed light source devices that generate a pair of two-mode squeezed lights, a first beam splitter that mixes and separates said a pair of two-mode squeezed lights, a sending device, a first receiving device, and a second receiving device. The system utilizes a difference in entanglement conditions of the pair of two-mode squeezed lights to allow the sending device to control quantum information transmitted alternately to the first and to the second receiving devices.

Another preferred embodiment of the present invention provides a quantum switch teleportation method, comprising providing pair of two-mode squeezed lights, mixing and separating said a pair of two-mode squeezed lights, and controlling a quantum information transmitted alternately to different receivers based on a difference in entanglement conditions of the pair of two-mode squeezed lights.

BRIEF DESCRIPTION OF THE DRAWING

FIG. 1 is schematic diagram of a quantum state teleportation system according to a preferred embodiment of the present invention.

DETAILED DESCRIPTION OF THE PREFERRED EMBODIMENTS

The preferred embodiments of the present invention provide a quantum switch teleportation system that can transmit quantum states from a sender alternately to two receivers. Preferably, one type of the quantum states are quantum states of light (i.e., quantum information). The system uses one pair of two mode squeezed state light sources directed onto one beam splitter. The system utilizes a change in the squeezed component of one of the pair of two mode squeezed state lights from its amplitude quadrature to its phase quadrature or a change in a relative phase between the pair of lights. In other words, a difference in entanglement conditions lets the sender control the quantum information transmitted to different receivers.

A preferred embodiment of a quantum state teleportation system of the present invention is illustrated in FIG. 1. The system comprises pair of two-mode squeezed light source devices 1, 2. These devices generate two-mode squeezed lights. A first beam splitter 3 is used to mix or compose the modes of the lights from the light source devices 1 and 2. The beam splitter 3 outputs two light beams. The first light beam is directed to a first polarizing beam splitter 5 and the second light beam is directed to a second polarizing beam splitter 6.

The first polarizing beam splitter 5 separates one of the two-mode squeezed light beams provided from the first beam splitter 3 based on its polarization. For example, the first polarizing beam splitter outputs vertically polarized light in a first direction and horizontally polarized light in a second direction. In a preferred aspect of the present invention, the polarizing beam splitter 5 directs horizontally polarized light to a second beam splitter 4 and directs vertically polarized light to a first receiving device 11. If desired, the polarization directions may be reversed.

The second polarizing beam splitter 6 separates the other one of the two-mode squeezed light beams provided by the first beam splitter 3 based on its polarization. For example, the second polarizing beam splitter 6 outputs vertically polarized light in a first direction and horizontally polarized light in a second direction. In a preferred aspect of the present invention, the polarizing beam splitter 6 directs horizontally polarized light out of the system and directs vertically polarized light to a second receiving device 12. If desired, the polarization directions may be reversed.

The second beam splitter 4 is located in a sending or transmitting device 9. The inputted quantum information (i.e., the unknown quantum states) are provided into the quantum information input section 10, which is also located in device 9. For example, the inputted quantum information may be in the form of a light beam.

The two-mode squeezed light separated by the first polarizing beam splitter 5 is mixed with the input signal or light beam from the quantum information input section 10 by the second beam splitter 4. The two beams output by the second beam splitter 4 are detected by respective detectors 7, 8. The detectors 7, 8 transform the detected light beams into electrical signals, such as an electrical photocurrents. The photocurrents are provided into a adding/subtracting device 26.

The device 26 transmits the difference of the photocurrents along a first path 23 to the first receiving device 11 and to the second receiving device 12. The device 26 transmits the sum of the photocurrents along a second path 24 to the first receiving device 11 and to the second receiving device 12. The sum of the photocurrents represents the quadrature amplitude. The difference of the photocurrents represents the phase noise power. The paths 23, 24 comprise classical channels which transmit classical rather than quantum information. The paths 23, 24 are preferably a wire which transmits a current. In an alternative embodiment of the present invention, the path comprises a radio wave path, where the information is transferred from an RF transmitter in the sending device 9 to an RF receiver in the receiving devices 11, 12 via radio frequency transmissions. In another alternative embodiment of the present invention, the path comprises a light wave path, where the information is transferred from light transmitter in the sending device 9 to an light receiver in the receiving devices 11, 12 via optical transmission through air or fiberoptics.

The photocurrents provided from the first 23 and second 24 paths into the receiving devices 11, 12 are amplified by amplifiers 19, 20, 21 and 22 and then provided into wave form arrangement devices, such as amplitude modulation devices 13, 16 and phase modulation devices 14, 17. The receiving devices 11, 12 provide output signals 15, 18, respectively, as shown in FIG. 1.

Preferably, a phase shift device 25 is provided between the light beams output by the light generation source devices 1, 2 to provide a difference between the relative phases of the light beams output by the light generation sources. Alternatively, a nondegenerate optical parameteric amplifier (NOPA) may be used to generate the EPR beams, and a phase shift between the EPR beams is generated by converting the relative phase between a pump and injected signal fields of the NOPA. The phase shift results in entanglement between the modes of the split beams. Specifically, the phase shift generates a switch entanglement between input section 10 light and receiving section 11 light or receiving section 12 light, alternatively. Thus, a pair of two-mode squeezed light beams shift their relative phase and generate switch entanglement by polarizing beam splitters to make it possible to obtain a quantum switch teleportation system that has two receivers, as will be described in more detail below.

The preferred teleportation method using the system of FIG. 1 operates as follows. The two-mode squeezed light source devices 1, 2 emit a pair of two mode squeezed lights or light beams. Each light beam is modulated to have the same frequency and to have perpendicular polarization by a beam modulator (not shown in FIG. 1). These light beams are directed to the first beam splitter 3. The light beams gathered on the first beam splitter 3 are directed to the first and second polarizing beam splitters 5, 6 and are then separated into fields or modes A, B, C and D in shown in FIG. 1 by first and second polarizing beam splitters 5 and 6 based on their polarization. For example, modes A and C may be horizontally polarized and fields B and D may be vertically polarized.

Based on the states of a pair of two-mode squeezed light, switch entangled state of mode A or mode B is outputted to the first receiving device 11 and entangled state of mode C or mode D is outputted to the second receiving device 12. The entanglement between the particular modes may be selected by choosing a suitable relative phase and component of squeezing by the phase shift device 25 or by converting the relative phase between a pump and injected signal fields of the NOPA. For example, mode A may be entangled with mode B or with mode D.

The inputted quantum states (quantum information), such as unknown quantum states, are sent to different receiving devices 11, 12 as follows. First, the quantum states (quantum information) are provided into quantum information input section 10 of the inputted information transmitting device 9. Then, the inputted information is gathered with the two-mode squeezed light beams on second beam splitter 4 and separated into a pair of beams. The separated pair of two-mode squeezed light beams are detected by the respective detectors 7 and 8. The information embodied in the light beams is transformed into an electric current (i.e., the photoelectric current) which carries the information. The difference information relating to the difference of the photocurrents transformed by the detectors is provided to the first receiving device 11 and to the second receiving device 12 through a first transmittal path 23. The sum information relating to the sum of the photocurrents transformed by the detectors is provided to the first receiving device 11 and to the second receiving device 12 through a second transmittal path 24. The sum and the difference of the photocurrents represent the quadrature amplitude and phase noise power, respectively.

The photocurrents are amplified and arranged by amplifier and wave form arrangement devices 19, 20, 21 and 22 located in the receiving devices 11, 12. Specifically, the photocurrents are separated into two parts and send to amplitude modulators 13, 16 and phase modulators 14, 17 located in the receiving devices 11, 12. The amplitude and phase modulators transform the photocurrent signals into one beam of EPR sources, after which the input signal is recovered.

The following description illustrates how to control quantum information transmitted to different receivers by using a difference in the variable entanglement conditions. For two spatially separated optical modes, $\alpha_j$ (j=1,2), the involved optical fields can be described by means of field quadratures, the amplitude quadrature $X_j = \alpha_j' + \alpha_j$ and the phase quadrature $Y_j = i(\alpha_j' + \alpha_j)$. Hence, quantum states are possible for which all the quadrature variables are uncertain, but certain joint variables of the two optical modes are well defined. This is known as two-mode squeezing for X or Y.

A pair of two-mode squeezed beams from sources 1, 2, which are coupled by two modes with identical frequency but orthogonal polarization and denoted by $\hat{a}_1 + \hat{a}_2$ and $\hat{a}_3 + \hat{a}_4$, are combined on the first beam splitter 3 with reflectivity r and transmissivity t, both being close to $2^{-1/2}$, and relative optical phase θ. The fields at the output ports (e, f) of the beam splitter 3 are then the linear superposition of the input fields:

$$\begin{pmatrix} \hat{e} \\ \hat{f} \end{pmatrix} = \begin{pmatrix} t & -re^{i\theta} \\ r & te^{i\theta} \end{pmatrix} \begin{pmatrix} \hat{a}_1 + \hat{a}_2 \\ \hat{a}_3 + \hat{a}_4 \end{pmatrix}$$

Introducing the quadrature amplitudes and phases for the outgoing fields in analogy to that for the squeezed lights and performing the algebra, the following formula is obtained:

$$\begin{pmatrix} \hat{X}_e \\ \hat{Y}_e \\ \hat{X}_f \\ \hat{Y}_f \end{pmatrix} = \begin{pmatrix} t & 0 & -r\cos\theta & r\sin\theta \\ 0 & t & -r\sin\theta & -r\cos\theta \\ r & 0 & t\cos\theta & -t\sin\theta \\ 0 & r & t\sin\theta & t\cos\theta \end{pmatrix} \begin{pmatrix} \hat{X}_1 + \hat{X}_2 \\ \hat{Y}_1 + \hat{Y}_2 \\ \hat{X}_3 + \hat{X}_4 \\ \hat{Y}_3 + \hat{Y}_4 \end{pmatrix}$$

By setting $t=r=2^{-1/2}$, the cross correlation between the two outgoing fields can be written as follows:

$$\begin{pmatrix} V(\hat{X}_e + \hat{X}_f) \\ V(\hat{X}_e - \hat{X}_f) \\ V(\hat{Y}_e + \hat{Y}_f) \\ V(\hat{Y}_e - \hat{Y}_f) \end{pmatrix} = \begin{pmatrix} 2 & 0 & 0 & 0 \\ 0 & 0 & 2\cos^2\theta & 2\sin^2\theta \\ 0 & 2 & 0 & 0 \\ 0 & 0 & 2\sin^2\theta & 2\cos^2\theta \end{pmatrix} \begin{pmatrix} V(\hat{X}_1 + \hat{X}_2) \\ V(\hat{Y}_1 + \hat{Y}_2) \\ V(\hat{X}_3 + \hat{X}_4) \\ V(\hat{Y}_3 + \hat{Y}_4) \end{pmatrix}$$

From the above equation, it can be seen that the entangled outgoing fields can be obtained by choosing the proper relative phase and squeezing component of one squeezed light while the squeezing component of the other light is fixed. The outgoing mode is coupled by four modes.

The fields or modes A, B, C, and D are separated from the outgoing fields by the polarizing beam splitters 5, 6 based on their polarization. They can be written as:

$$\begin{pmatrix} \hat{A} \\ \hat{B} \\ \hat{C} \\ \hat{D} \end{pmatrix} = \begin{pmatrix} \sqrt{2}/2 & 0 & \sqrt{2}/2e^{i\theta} & 0 \\ 0 & \sqrt{2}/2 & 0 & \sqrt{2}/2e^{i\theta} \\ \sqrt{2}/2 & 0 & -\sqrt{2}/2e^{i\theta} & 0 \\ 0 & \sqrt{2}/2 & 0 & -\sqrt{2}/2e^{i\theta} \end{pmatrix} \begin{pmatrix} \hat{a}_1 \\ \hat{a}_2 \\ \hat{a}_3 \\ \hat{a}_4 \end{pmatrix}$$

The cross correlations of the quadrature component among them are provided from the following formulas:

$$V(\hat{X}_A + \hat{X}_B) = \frac{1}{2}V(\hat{X}_1 + \hat{X}_2) + \frac{1}{2}\cos^2\theta V(\hat{X}_3 + \hat{X}_4) + \frac{1}{2}\sin^2\theta V(\hat{Y}_3 - \hat{Y}_4),$$

$$V(\hat{X}_A - \hat{X}_B) = \frac{1}{2}V(\hat{X}_1 - \hat{X}_2) + \frac{1}{2}\cos^2\theta V(\hat{X}_3 - \hat{X}_4) + \frac{1}{2}\sin^2\theta V(\hat{Y}_3 - \hat{Y}_4),$$

$$V(\hat{X}_A + \hat{X}_D) = \frac{1}{2}V(\hat{X}_1 + \hat{X}_2) + \frac{1}{2}\cos^2\theta V(\hat{X}_3 - \hat{X}_4) + \frac{1}{2}\sin^2\theta V(\hat{Y}_3 - \hat{Y}_4),$$

$$V(\hat{X}_A - \hat{X}_D) = \frac{1}{2}V(\hat{X}_1 - \hat{X}_2) + \frac{1}{2}\cos^2\theta V(\hat{X}_3 + \hat{X}_4) + \frac{1}{2}\sin^2\theta V(\hat{Y}_3 - \hat{Y}_4),$$

$$V(\hat{Y}_A + \hat{Y}_B) = \frac{1}{2}V(\hat{Y}_1 + \hat{Y}_2) + \frac{1}{2}\cos^2\theta V(\hat{Y}_3 + \hat{Y}_4) + \frac{1}{2}\sin^2\theta V(\hat{X}_3 + \hat{X}_4),$$

$$V(\hat{Y}_A - \hat{Y}_B) = \frac{1}{2}V(\hat{Y}_1 - \hat{Y}_2) + \frac{1}{2}\cos^2\theta V(\hat{Y}_3 - \hat{Y}_4) + \frac{1}{2}\sin^2\theta V(\hat{X}_3 - \hat{X}_4),$$

$$V(\hat{Y}_A + \hat{Y}_D) = \frac{1}{2}V(\hat{Y}_1 + \hat{Y}_2) + \frac{1}{2}\cos^2\theta V(\hat{Y}_3 - \hat{Y}_4) + \frac{1}{2}\sin^2\theta V(\hat{X}_3 - \hat{X}_4),$$

$$V(\hat{Y}_A - \hat{Y}_D) = \frac{1}{2}V(\hat{Y}_1 - \hat{Y}_2) + \frac{1}{2}\cos^2\theta V(\hat{Y}_3 + \hat{Y}_4) + \frac{1}{2}\sin^2\theta V(\hat{X}_3 + \hat{X}_4).$$

Thus, choosing a suitable relative phase and component of squeezing, results in entanglement between mode A and mode B or between mode A and mode D, alternatively. For example, mode A will be entangled with mode B if a relative phase of zero (θ=0) is selected and one of two-mode squeezed lights is squeezed in the component of $\hat{X}_1 - \hat{X}_2$ ($\hat{Y}_1 + \hat{Y}_2$) and the other one is squeezed in the component of $\hat{X}_3 - \hat{X}_4$ ($\hat{Y}_3 + \hat{Y}_4$). However, mode A will be entangled with mode D by changing the squeezed component from $\hat{X}_3 - \hat{X}_4$ ($\hat{Y}_3 + \hat{Y}_4$). Furthermore, when the squeezed component of ($\hat{X}_1 - \hat{X}_2$) ($\hat{Y}_1 + \hat{Y}_2$) is fixed for one two-mode squeezed light and $\hat{X}_3 - \hat{X}_4$ ($\hat{Y}_3 + \hat{Y}_4$) for the other light, the above mentioned entanglement can be obtained by choosing a relative phase of θ=0 or θ=π/2. More generally, other kinds of entanglements can be obtained by choosing a different relative phase between the two fields and their squeezed component. Accordingly, the difference in entanglement conditions lets the sender control the quantum information transmitted to different receivers. The details of the calculations are provided in more detail an article in the European Physical Journal D, 21, 361 (2002) by Y. Zhang, K. Kasai and M. Watanabe titled "Continuous variables quantum switch teleportation using two-mode squeezed light" which is incorporated herein by reference in its entirety. All other articles mentioned herein are also incorporated herein by reference in their entirety.

As used herein, the term "entanglement" means the quantum correlations between two or more modes, where the quantum states of different modes are correlated with each other. One example of entanglement is 'two-mode squeezing' described above. For example, in two-mode squeezing, when two frequency modes suffixed by 1 and 2 are measured separately, they have a larger noise than shot noise. However, when the two frequency modes are measured simultaneously, noise is squeezed to less than shot noise. In application, the measurement of the sum and difference, such as $<(X_1+X_2)^2>$ and $<(Y_1-Y_2)^2>$, are equivalent to the simultaneous measurement. The quantum correlation of each mode 1 and 2 make it possible to squeeze these dispersions. The two-mode squeezed light is such squeezed light.

Two-mode squeezed light is also called EPR type light because Einstein, Podolsky and Rosen had stated that if such a state could be realized in a macro scale, then strange results that could not be explained by classical physics would occur. This has been dubbed as the EPR paradox. However, it has been established that such phenomenon really happens. Further, it can be applied to a teleportation technique that contains the novel information, a cryptography technique, a signal disposing technique and other techniques. Until recently, the quantum entangled state was a phenomena only found on the atomic scale. However, the quantum entangled state has become applicable to a scale of more than tens of kilometer. Generating and controlling of quantum entangled states based on continuous physical amount called orthogonal amplitude enables high quality quantum teleportation, quantum communication and quantum measurement techniques.

The following paragraphs provide preferred, non-limiting examples of the components of the teleportation system. The two-mode squeezed light source devices 1, 2 can comprise any suitable devices used in the art. Examples of such devices 1, 2 are devices that emit continuous wave light and devices that contain a pulse laser, a nonlinear material and an optical cavity. An example of a continuous wave light emitting device is a YAG laser. Preferably, the second-harmonic light of YAG laser having a wavelength of 532 nm is used.

The examples for pulse laser sources are pulse lasers having a FWHM of 10 femtosecond to 1 picosecond, preferably, sub picosecond and sub femtosecond. The femtosecond laser is most preferable because it has very large power and precisely induce entangled states.

The examples of non-linear materials are non-liner crystals and light fibers. When continuous wave light is used as a light source, it is preferable to use non-linear crystals as the non-linear material. Non-linear materials give the laser light second and/or third non-linear effects. When materials receive the lights, a polarization is induced in the materials. Generally, first order polarization is induced in relation to the electric field of the light and the light that has the same frequency as incident light is emitted because of the polarization. On the other hand, high order polarization, for example, second and third order polarization happen to be induced in the materials. The emitted light sometimes has a frequency twice or three times as that of the incident light on such occasions. These high order polarizations are called non-linear polarization and the phenomenon that induce these polarization is called non-linear optical phenomenon. To generate two-mode squeezed light, it is preferable to use optical parametric effects.

In the system of the present invention, it is preferable that phase control devices, such as device 25, are equipped to control the relative phase of two-mode squeezed light generated by a pair of two-mode squeezed light source devices 1, 2. Preferably, synchronic systems are embodied in two-mode squeezed light source devices to synchronize two-mode squeezed lights generated by two two-mode squeezed light source devices. A phase shift device or phase shift devices can be equipped on the light path with or without phase control devices and/or synchronic systems. The example of the phase shift device or phase shift devices are preferably the devices that can move and bring about a phase shift of squeezed light on the light path.

One example of phase shift devices are devices that shift light phase between 0 and $\pi/2$. Other examples of phase shift devices are the optical devices that can change light length and electrooptical modulators, preferably the devices that can control light phase that modulate light electrically and mechanically. The phase shift described above makes it possible for the input information to be sent selectively to two receivers, and to change the receiver that receives the light.

Any suitable beam modulators can be used for the generated beam modulator. Preferably, a pair of two-mode squeezed lights are modulated to have the same frequency while the their polarization is at right angle to each other.

Any suitable beam splitters may used for the beam splitters 3, 4 in the system shown in FIG. 1. The examples of the beam splitters are suitable optical devices. The preferred example of beam splitters are the beam splitters that can divide a light into two lights that have half power of original light (i.e., 50:50 beam splitters). Other types of beam splitters can also be used.

Any suitable polarizing beam splitters may be used for polarizing beam splitters 5, 6 in the system shown in FIG. 1. Polarizing beam splitters are optical devices that can separate light based on its polarization surface. Preferred examples of the polarizing beam splitters are the ones that can separate light into polarized directions of horizontal and vertical.

The quantum state (quantum information) input section may be any suitable light source, such as a YAG laser, LD, and any other radiation sources that can emit lights having specific quantum information. The examples of inputted quantum states (quantum information) are a specific coherent state, squeezed states and so on. However, these states are not limited these examples. Inputted quantum states (quantum information) may be, for example, quantum state of arbitrary lights.

Any suitable detectors 7, 8 may be used. Preferably, the detectors 7, 8 comprise a photodetector and an amplifier or transformer. The detectors and amplifiers may comprise single integrated devices or two separate devices. The examples of detectors are PN photodiode, PIN photodiode, Avalanche photodiode, heterodyne detector and homodyne detector. The homodyne detectors that can divide based on the frequency of lights are preferred. The quantum states are, for example, photon number squeezing and entanglement. The amplifier may be any suitable device which can amplify the information relating to light into the information relating to electric currents. The example of such detector and amplifier is an integrated detector and amplifier using photodiodes.

Any suitable control device or devices (i.e., controllers) may be used in the present invention to optimize entangled states. An example of such control devices is the device that has quantum information receiving unit that receives the quantum information of light from detector and a calculating unit that applies an optimizing algorithm that makes the quantum state. For example, entangled state of pulsed light is provided to a desired value based on the quantum information received by the quantum information receiving unit and calculated by the calculating unit to arrange the wave form to wave form arranging devices. The optimizing algorithm is, for example, an optimizing algorithm that minimizes the sum of difference and sum of dispersion of two mode orthogonal phase amplitude (X, Y). The examples of such optimizing algorithm are the Fourier Repeating Algorithm and the optimizing algorithm based on Simulated Annealing as described in Japanese Laid Open Patent application H11-54397 and in the article in Oplus. E. November p 83 incorporated herein by reference. The Simulated Annealing algorithm is preferred.

The quantum switch teleportation system of the present invention can be used for many kinds of quantum information communication techniques. For example, the system can used for quantum teleportation in which receiving side receives unknown quantum state from sending side where by sharing two modes, entanglement is generated, to sending side and several receiving sides. The system also can be applied to quantum cryptography that can detect wire tapping. The system further can be applied to quantum cryptography that contains a cryptography key, to a delivery technique of quantum cryptography and to a network among quantum computers.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

We claim:

1. A quantum switch teleportation system, comprising:
only one pair of two-mode squeezed light source devices that generate a pair of two-mode squeezed lights;
a first beam splitter that mixes and separates said pair of two-mode squeezed lights;
a first polarizing beam splitter that separates one of the said pair of two-mode squeezed lights separated by the first beam splitter based on its polarization;
a second polarizing beam splitter that separates the other one of the pair of two-mode squeezed light separated by the first beam splitter based on its polarization;
a second beam splitter that mixes an input signal with the two-mode squeezed light separated by the first polarizing beam splitter and separates the mixed input signal and the two-mode squeezed light separated by the first polarizing beam splitter;
a quantum information input section that inputs the input signal comprising quantum states having quantum information;
a pair of detectors that detect a pair of two-mode squeezed lights mixed and separated on the second beam splitter and transform the pair of two-mode squeezed lights into electric currents containing information;
a first receiving device;
a second receiving device;
a first transmit path that transmits a difference information relating to the electric currents transformed by said detectors to the first receiving device and to the second receiving device; and
a second transmit path that transmits a sum information relating to the electric currents transformed by said detectors to the first receiving device and to the second receiving device,
wherein only the first beam splitter is used to initially mix the pair of two-mode squeezed lights.

2. The system of claim 1, further comprising at least one phase shift device located in a path between the pair of two-mode squeezed light source devices and the first beam splitter.

3. The system of claim 2, wherein the at least one phase shift device creates a difference in the phase between the pair of two-mode squeezed lights.

4. The system of claim 1, further comprising a sending device containing the input section, the second beam splitter and the pair of detectors.

5. The system of claim 4, wherein the first and the second path comprise wires.

6. The system of claim 1, wherein the first beam splitter is located in an optical path between the pair of two-mode squeezed light source devices and the first and the second polarizing beam splitters.

7. The system of claim 6, wherein:
the first polarizing beam splitter provides polarized light into the first receiving device; and
the second polarizing beam splitter provides polarized light into the second receiving device.

8. The system of claim 1, wherein each of the first and the second receiving devices contains an amplitude modulator and a phase modulator which receive the polarized light from the first and the second beam splitters and transform the photocurrent signals into one beam of EPR sources, such that the input signal is recovered.

9. The system of claim 1, wherein the pair of two-mode squeezed light source devices and the input section comprise lasers.

10. A quantum switch teleportation system, comprising:
a pair of two-mode squeezed light source devices that generate a pair of two-mode squeezed lights;
a first beam splitter that mixes and separates said a pair of two-mode squeezed lights;
a sending device;
a first receiving device; and
a second receiving device;
wherein the system utilizes a difference in entanglement conditions of the pair of two-mode squeezed lights to allow the sending device to control quantum information transmitted alternately to the first and to the second receiving devices, and
wherein the system contains only one pair of two-mode squeezed light source devices and only the first beam splitter is used to initially mix the pair of two-mode squeezed lights.

11. The system of claim 10, wherein the system utilizes a change in a squeezed component of one of the pair of two mode squeezed state lights from its amplitude quadrature to its phase quadrature to obtain the difference in entanglement conditions to allow the sending device to control quantum information transmitted alternately to the first and to the second receiving devices.

12. The system of claim 10, further comprising:
at least one phase shift device located in a path between the pair of two-mode squeezed light source devices and the first beam splitter, wherein the system utilizes a change in a relative phase between the pair of lights to obtain the difference in entanglement conditions to allow the sending device to control quantum information transmitted alternately to the first and to the second receiving devices.

13. The system of claim 10, further comprising:
a first polarizing beam splitter that separates one of the said pair of two-mode squeezed lights separated by the first beam splitter based on its polarization;
a second polarizing beam splitter that separates the other one of the pair of two-mode squeezed light separated by the first beam splitter based on its polarization;
a second beam splitter that mixes an input signal with the two-mode squeezed light separated by the first polarizing beam splitter and separates the mixed input signal and the two-mode squeezed light separated by the first polarizing beam splitter;
a quantum information input section that inputs the input signal comprising quantum states having quantum information;
a pair of detectors that detect a pair of two-mode squeezed lights mixed and separated on the second beam splitter and transform the pair of two-mode squeezed lights into electric currents containing information;
a first transmit path that transmits a difference information relating to the electric currents transformed by said detectors to the first receiving device and to the second receiving device; and
a second transmit path that transmits a sum information relating to the electric currents transformed by said detectors to the first receiving device and to the second receiving device.

14. A quantum switch teleportation method, comprising:
providing only one pair of two-mode squeezed lights;
mixing and separating said a pair of two-mode squeezed lights; and
controlling a quantum information transmitted alternately to different receivers based on a difference in entanglement conditions of the pair of two-mode squeezed lights,
wherein only one beam splitter is used to initially mix and separate the pair of two-mode squeezed lights.

15. The method of claim 14, wherein:
the quantum information is mixed with a separated two-mode squeezed light; and
the quantum information is provided to either a first receiver or to a second receiver via classical channels based on the difference in entanglement conditions of the pair of two-mode squeezed lights.

16. The method of claim 15, wherein the difference in entanglement conditions of the pair of two-mode squeezed lights is obtained by a change in the squeezed component of one of the pair of two mode squeezed state lights from its amplitude quadrature to its phase quadrature.

17. The method of claim 15, wherein the difference in entanglement conditions of the pair of two-mode squeezed lights is obtained by a change in a relative phase between the pair of lights.

* * * * *